J. Y. McL. COMRIE.
HARROW.
APPLICATION FILED APR. 2, 1920.
1,385,861.
Patented July 26, 1921.
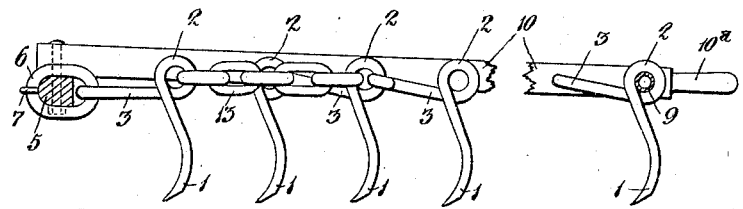
FIG. 1.
FIG. 2.
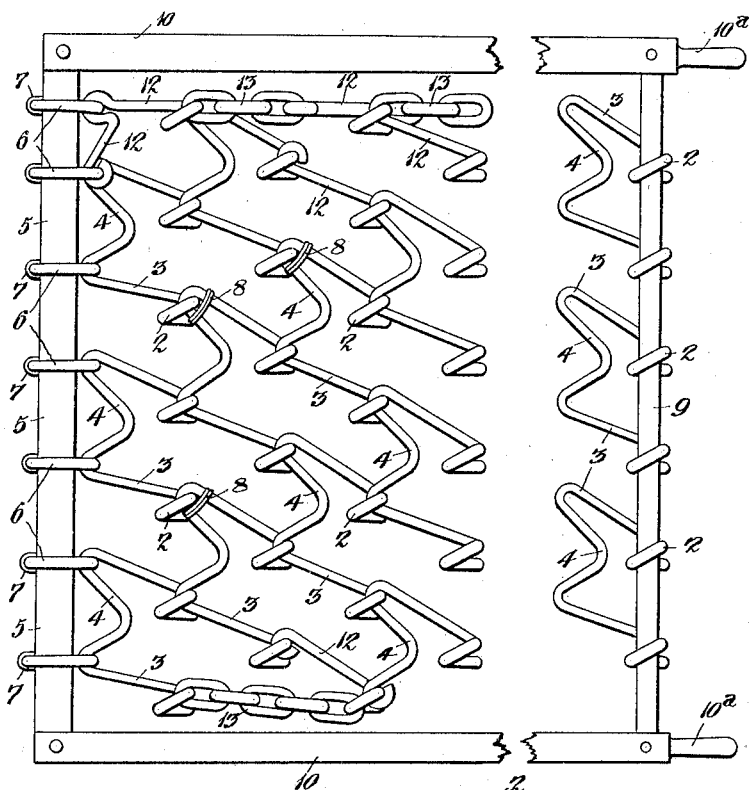
FIG. 3.
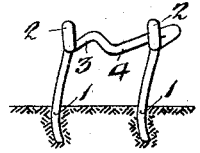
Inventor:
JAMES YOUNG McLACHLANE COMRIE
per H. W. Pencer.
Attorney.

UNITED STATES PATENT OFFICE.

JAMES YOUNG McLACHLANE COMRIE, OF RUNCIMAN, AUCKLAND, NEW ZEALAND.

HARROW.

1,385,861.  Specification of Letters Patent.  Patented July 26, 1921.

Application filed April 2, 1920. Serial No. 370,854.

*To all whom it may concern:*

Be it known that I, JAMES YOUNG Mc-LACHLANE COMRIE, a citizen of the Dominion of New Zealand, residing at Runciman, Auckland, New Zealand, have invented certain new and useful Improvements in Harrows, of which the following is a specification.

This invention relates to harrows and provides an improved harrow of the link type.

According to the invention the harrow is built up of sections having tines integral therewith and between which and the remainder of the sections springs are provided.

The sections each consist of a piece of steel bent to provide tines, said tines when a pair thereof project from the same section being connected by a forwardly projecting slanting portion containing a rearwardly bent cross piece.

The upper ends of the tines are given one or more turns vertically to form the springs, which provide for give and flexibility between the tines and the remainder of the sections, and at the same time provide for the connecting up of the sections in rows to form the harrow.

The harrow has a front cross bar, attached to which is the first row of sections, and may have a rear tube or bar passed through the springs of the back row of sections by which the harrow can be drawn the reverse way, and also side or top bars connecting said rear tube or bar with the front bar. The side or top bars extend to the rear of the harrow to provide handles for lifting same.

Fasteners are provided to prevent the sections working forward in the preceding sections, and part sections and chains are employed to fill up the spaces left at the ends of the rows owing to the slanting formation of the sections.

Referring to the accompanying drawing in conjunction with which the invention well be more particularly described—

Figure 1 is a side view (broken) of portion of harrow with a side bar removed.

Fig. 2 is a plan view (broken) of portion of a harrow and

Fig. 3 is a back view of a section.

Each section consists of a piece of spring steel bent to provide two tines 1 spaced a short distance apart.

At the upper ends of the tines 1 the steel is given one or more turns to form springs 2 and from the latter arms 3 project forward in a slanting direction, said arms 3 being connected by rearwardly bent cross portions 4.

The tines 1, springs 2, arms 3 and cross portions 4 of each section are all formed from one piece of steel.

The sections of the first row are connected with the front cross bar 5 by links 6 secured thereon by staples 7 or the like, said links 6 engaging the sections at the angles formed by the junctions of the arms 3 with the cross portions 4.

The sections of the second row are connected to the sections of the first row by passing the tines 1 of the first row through the sections of the second row, so that the springs 2 of the first row engage the sections of the second row, at the angles formed by the junctions of the arms 3 and cross portions 4.

Any number of rows of sections similarly formed can be linked up as described to provide a harrow of the required dimensions with the sections slanting either to the right or to the left.

To prevent the sections of the second or any subsequent row from working forward in the springs 2 of the preceding row of sections, a wire or metal strap or cast fitting 8 is secured across the arms 3 and the cross portions 4 behind the springs 2 of the sections of the preceding row.

A tube or bar 9 by means of which the harrow is enabled to be drawn backward can be passed through the springs 2 of the sections of the rear row, said tube or bar being connected to the front bar 5 by stiffening bars 10 which are extended to the rear to provide handles $10^a$.

The arms 3 are made of a length equal to the distance between the rows of tines 1. Owing to the slanting direction of said arms 3 spaces are left at the ends of some of the rows of sections, and to fill these spaces and thereby provide the harrow with sides approximately at right angles to its back and front edges, semi or part sections 12 are utilized.

Also where semi or part sections 12 cannot be fitted in at the sides of the harrow, chains 13 are used to connect the rows of sections.

The harrow as above described is of simple construction, has no working parts such as bolts, nuts and the like to be loosened, more effective working and better clearance is obtained than with a rigid tine harrow, owing to the spring or give between tines 1 and the arms 3, and to the general flexibility of the harrow.

The sections can be varied in size and weight to suit the class of work for which the harrow is to be used and can be made to slant either to the right or to the left as required.

What I do claim and desire to secure by Letters Patent of the United States is:—

1. A harrow composed of sections, having tines projecting therefrom; springs at the upper ends of the tines; arms approximately parallel to each other extending forward from said springs; and rearwardly bent cross portions connecting said arms.

2. A harrow composed of sections, having tines projecting therefrom; springs at the upper ends of the tines; slanting arms approximately parallel to each other extending forward from said springs; rearwardly bent cross portions connecting the extreme forward ends of said arms; said tines, springs, arms and cross portion being formed in the one piece.

3. A harrow composed of interlinking sections in rows, said sections having tines projecting therefrom; springs connecting said tines with the remaining portions of said sections and formed integral with both of the latter; a front bar connected to the first row of sections; a bar through the springs of the back row of sections and bars connecting said front and rear bars.

4. A harrow composed of sections in rows, said sections having tines projecting therefrom; springs at the upper ends of the tines; slanting arms extending forward from said springs; rearwardly bent cross portions connecting said arms, the springs of a row of sections engaging the sections of the following row in the angles formed by the junctions of the arms and cross portions thereof; a front bar connected to the first row of sections; a bar through the springs of the back row of sections; side bars connecting said front and rear bars; handles at the rear of said side bars; and chains connecting the ends of said rows.

In testimony whereof I affix my signature in presence of two witnesses.

JAMES YOUNG McLACHLANE COMRIE.

Witnesses:
WILLIAM CRICHES,
ELSA GREENE.